US012807116B2

(12) United States Patent
Jeyakar M R et al.

(10) Patent No.: US 12,807,116 B2
(45) Date of Patent: Nov. 24, 2026

(54) BRAKE RELEASE SYSTEM FOR A VEHICLE COMPRISING A PARKING BRAKE HAVING A BRAKE CHAMBER

(71) Applicant: Volvo Truck Corporation, Gothenburg (SE)

(72) Inventors: Amarnath Jeyakar M R, Surandai (IN); Sabarinivas Devendran, Malleshapalaya (IN); Agnila C, Moodabidre (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 380 days.

(21) Appl. No.: 18/590,083

(22) Filed: Feb. 28, 2024

(65) Prior Publication Data

US 2024/0308490 A1 Sep. 19, 2024

(30) Foreign Application Priority Data

Mar. 16, 2023 (EP) .................................... 23162228

(51) Int. Cl.
*B60T 15/02* (2006.01)
*B60T 13/68* (2006.01)
(Continued)

(52) U.S. Cl.
CPC ........... *B60T 15/027* (2013.01); *B60T 13/683* (2013.01); *B60T 15/041* (2013.01); *B60T 17/043* (2013.01)

(58) Field of Classification Search
CPC .... B60T 11/326; B60T 13/683; B60T 15/027; B60T 15/041; B60T 15/70; B60T 17/04; B60T 17/043
See application file for complete search history.

(56) References Cited

U.S. PATENT DOCUMENTS

2010/0237690 A1 9/2010 Foerster et al.
2017/0197603 A1 7/2017 Minato et al.
(Continued)

FOREIGN PATENT DOCUMENTS

DE 3522432 A1 * 7/1986 .............. B60T 15/38
EP 1888389 B1 3/2010
WO WO-2008061799 A1 * 5/2008 .............. B60T 17/18

OTHER PUBLICATIONS

European Office Action, European Application No. 23162228.3, mailed Mar. 5, 2025, 4 pages.
(Continued)

*Primary Examiner* — James J Taylor, II
(74) *Attorney, Agent, or Firm* — Sage Patent Group

(57) ABSTRACT

A brake release system including a parking brake having a brake chamber is disclosed. The system includes a regular air supply passage, and an auxiliary air supply passage configured to supply pressurized air to the brake chamber for releasing the parking brake. A valve device is provided in the auxiliary air supply passage, the valve device including an exhaust port. A pressure-responsive element is configured to actuate the valve device and configured to be in fluid communication with the regular air supply passage, such that when pressurized air is supplied through the regular air supply passage then the air activates the pressure-responsive element so as to actuate the valve device to move to a closed first state, and when no pressurized air is supplied through the regular air supply passage then the pressure-responsive element is deactivated to allow the valve device to move to an open second state.

20 Claims, 7 Drawing Sheets

(51) Int. Cl.

| | |
|---|---|
| ***B60T 15/04*** | (2006.01) |
| ***B60T 17/04*** | (2006.01) |

(56) References Cited

U.S. PATENT DOCUMENTS

| | | | | |
|---|---|---|---|---|
| 2018/0273014 | A1 | 9/2018 | Boulivan | |
| 2019/0308599 | A1 | 10/2019 | Schmidt et al. | |
| 2020/0189550 | A1 | 6/2020 | Van Thiel et al. | |
| 2022/0289159 | A1 | 9/2022 | Van Thiel et al. | |
| 2023/0010827 | A1 | 1/2023 | Van Thiel et al. | |
| 2025/0171005 | A1 * | 5/2025 | Jeyakar M R ............ | B60T 8/94 |

OTHER PUBLICATIONS

Extended European Search Report, European Application No. 23162228.3, mailed Jun. 30, 2023, 5 pages.

Communication under Rule 71(3) EPC Intention to Grant mailed Jun. 24, 2025 for European Patent Application No. 23162228.3, 39 pages.

* cited by examiner

BRAKE RELEASE SYSTEM FOR A VEHICLE COMPRISING A PARKING BRAKE HAVING A BRAKE CHAMBER

CROSS REFERENCE TO RELATED APPLICATIONS

This application claims priority to European Patent Application No. 23162228.3, filed on Mar. 16, 2023, the disclosure and content of which is incorporated by reference herein in its entirety.

TECHNICAL FIELD

The disclosure relates generally to a brake release system. In particular aspects, the disclosure relates to a brake release system for a vehicle comprising a parking brake having a brake chamber. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Vehicles that comprise a parking brake which has a brake chamber may be released by providing pressurized air into the brake chamber. When the air pressure in the brake chamber drops, the parking brake becomes applied. In case of a breakdown, the parking brake needs to be released to facilitate towing the vehicle away. If the usual source of pressurized air is not working, i.e. the parking brake cannot be released by providing pressurized air into the brake chamber, then you can often release the parking brake by manually handling a caging bolt which is located at the brake chamber. In order to use the caging bolt, the operator needs to go under the chassis to get access to the caging bolt. Going under the chassis is, however, not suitable for all cases. For instance, if the vehicle is standing in flooded and/or mud surface, accessing the caging bolt may not be safe, not practically possible, or at least not desirable.

SUMMARY

According to a first aspect of the disclosure, there is provided a brake release system for a vehicle comprising a parking brake having a brake chamber, the brake release system comprising:

- a regular air supply passage configured to supply pressurized air to the brake chamber for releasing the parking brake,
- an auxiliary air supply passage configured to supply pressurized air to the brake chamber for releasing the parking brake, wherein the auxiliary air supply passage is configured to be used in case of failure of the regular air supply passage,
- a valve device provided in the auxiliary air supply passage, the valve device comprising an exhaust port, wherein the valve device has:
  - a closed first state in which pressurized air is prevented from being supplied from the auxiliary air supply passage to the brake chamber through the valve device, and in which closed first state any pressurized air in the auxiliary air supply passage is exhausted via the exhaust port of the valve device, and

- an open second state in which pressurized air is allowed to be supplied from the auxiliary air supply passage to the brake chamber through the valve device for releasing the parking brake,
- a pressure-responsive element configured to actuate the valve device and configured to be in fluid communication with the regular air supply passage, such that when pressurized air is supplied through the regular air supply passage then the pressurized air activates the pressure-responsive element so as to actuate the valve device to move to said closed first state, and when no pressurized air is supplied through the regular air supply passage then the pressure-responsive element is deactivated to allow the valve device to move to said open second state. The first aspect of the disclosure may seek to facilitate the handling of breakdown vehicles, in particular facilitating the operation of the parking brake. A technical benefit may include that the by providing an auxiliary air supply passage which can be used in case of failure of the regular air supply passage, there is no need for accessing a caging bolt. Furthermore, by providing the auxiliary air supply passage with a valve device that is controllable by the pressurized air in the regular air supply passage, the system can easily become reset when the failure of the regular air supply passage has been repaired. Thus, the system of the present disclosure not only enables a convenient release of the parking brake when the regular air supply passage has failed, thereby allowing the vehicle to be towed away after a breakdown, but the system also facilitates the handling at a later stage when the vehicle has been repaired in a workshop and the regular air supply passage functions once again. At that point in time, you want to be able to release the pressurized air in the auxiliary air supply passage. The valve device functions as an auto-exhaust valve which can be triggered by a "pilot signal" from the regular air supply passage.

In some examples, optionally the brake release system may further comprise:

- an auxiliary supply port configured to be able to receive pressurized air, wherein the auxiliary air supply passage is configured to interconnect the auxiliary supply port with the brake chamber,
- wherein in the closed first state of the valve device, fluid communication from the auxiliary supply port to the brake chamber is disconnected,
- wherein in the open second state of the valve device, fluid communication from the auxiliary supply port to the brake chamber is allowed, such that when the auxiliary supply port receives pressurized air and the valve device is in the open second state, the pressurized air flows from the auxiliary supply port via the auxiliary air supply passage and the valve device to the brake chamber, thereby releasing the parking brake.

A technical benefit may include that by having an auxiliary supply port, a greater versatility may be provided. The pressurized air that is received by the auxiliary supply port may come from any suitable available source. For instance, the pressurized air source may be present on the vehicle itself, or it may be located elsewhere, such as on another vehicle.

In some examples, optionally the brake release system may further comprise:

- a check valve provided in the auxiliary air supply passage at a location between the auxiliary supply port and the valve device, wherein the check valve is configured to allow pressurized air to be passed from the auxiliary supply port to the valve device, but prevent pressurized air from being passed from the valve device to the auxiliary supply port. A technical benefit may include that the pressure in the auxiliary air supply passage and in the brake chamber can be maintained as long as the valve device is in its open second state.

In some examples, optionally the brake release system may further comprise:

an auxiliary pressure port which is configured to be able to receive pressurized air from an air compressor of the vehicle, wherein the auxiliary supply port is connectable to the auxiliary pressure port so as to receive the pressurized air from the air compressor via the auxiliary pressure port.

A technical benefit may include that, as long as the air compressor of the vehicle is still functional, this provides a convenient and simple way to provide pressurized air to the auxiliary supply port, i.e. via the auxiliary pressure port. The pressurized air may, for example, come via an air production modulator ("APM") which may also be used for controlling the pressure in the regular air supply passage. The APM may thus suitably be controlled to convey the pressurized air from the compressor to the regular air supply passage and/or to the auxiliary pressure port.

In some examples, optionally the brake release system may further comprise:

a flow channel extending from the auxiliary pressure port to the auxiliary supply port, and a controllable valve provided in said flow channel, the controllable valve having a closed position in which air flow from the auxiliary pressure port to the auxiliary supply port is prevented, and an open position in which air flow from the auxiliary pressure port to the auxiliary supply port is allowed, wherein the controllable valve is mechanically controllable, such as by means of a lever, or electronically controllable to switch between said closed and open positions.

A technical benefit may include that by having a controllable valve between auxiliary pressure port and the auxiliary supply port the communication there between can be handled at will. The user interface for controlling the controllable valve may be provided in any suitable and easily accessible location on the vehicle. For instance, in the case of a mechanically controllable valve, such as by means of a lever, the lever or other control element may be provided at an easily accessible location on the outside of the vehicle or even inside a driver's cabin. In the case of an electronically controllable switch, it may suitably be provided in the cabin, although externally of the cabin is also conceivable.

In some examples, optionally the brake release system may further comprise:

a hose for connecting the auxiliary pressure port to the auxiliary supply port.

A technical benefit may include that the hose can not only be used for conveniently connecting the auxiliary pressure port to the auxiliary supply port, but the hose may also be used for providing pressure to another vehicle which also has an auxiliary supply port, in case that other vehicle needs assistance with releasing the parking brake. Thus, in some examples, the vehicle may be equipped with both options discussed above for putting the auxiliary pressure port in fluid communication with auxiliary supply port, i.e. a flow channel with a controllable valve and a hose which can be manually be connect to the auxiliary pressure port and auxiliary supply port. Contrary to using the known technique of a caging bolt located in a brake chamber which may be difficult to access in some situations (e.g. flooded or mud surface) the auxiliary pressure port and the auxiliary supply port may be installed at an easily accessible part of the vehicle. For instance, the auxiliary pressure port and the auxiliary supply port may be integrated in a common auxiliary module mounted at an appropriate part of the vehicle.

In some examples, optionally the auxiliary supply port is connectable to an auxiliary pressure port of another vehicle to allow for receipt of pressurized air from the other vehicle. A technical benefit may include that the parking brake can still be released even though pressurized air source, e.g. an air compressor, on the present vehicle is no longer functional.

In some examples, optionally the pressure-responsive element is part of or is mechanically connected to the valve device, such that when the pressure-responsive element is subjected to the pressurized air from the regular air supply passage, the pressure-responsive element is moved, causing the valve device to be moved to said closed first state. A technical benefit may include that a simple transfer of pressure into a moving force may be achieved. The pressure-responsive element may have a pressure receiving area, the size of which May determine the pressing force on the pressure-responsive element. Thus, in these examples, there is no need for an electronic control signal for changing the state of the valve device. Instead, the "pilot signal" may be provided by a fluid, in particular air, which pushes the pressure-responsive element. Suitably, the pressure-responsive element may be configured to move the valve device to the closed first state only if a defined threshold pressure is reached, in order to avoid closing the valve device prematurely.

In some examples, optionally the brake release system may further comprise:

a bleed passage configured to be in fluid communication with the regular air supply passage, wherein the bleed passage is configured to bleed air from the regular air supply passage to the pressure-responsive element. A technical benefit may include that the pressure-responsive element will be subjected to the same air pressure as the brake chamber. Thus, when the brake chamber is become pressurized by the pressurized air from the regular air supply passage, the corresponding air pressure causes the valve device to move to the closed first state.

In some examples, optionally said valve device is a pressure-actuated valve device. As understood from the above discussion, a technical benefit may include that there is no need for any electronic control of the valve device. Instead, a simple fluid-based control which utilizes fluid pressure to move the pressure-responsive element, which in turn causes the valve device to move, may be provided.

In some examples, optionally the pressure-responsive element comprises a pressure-responsive switch which is configured to send an electric signal when activated, wherein the valve device is configured to be actuated by the electric signal to move to the closed first state. A technical benefit may include that instead of installing additional conduits for leading fluid to the valve device for controlling the valve device, simple wiring may be drawn to allow electronic signals to be sent to the valve device for the control thereof. In some examples, the valve device may suitably be or comprise a solenoid valve actuated by the electronic signal.

In some examples, optionally the brake release system may further comprise:

a spring device configured to bias the valve device towards said open second state. A technical benefit may include that, when the pressure-responsive element does not actuate the valve device, the valve device will automatically allow any pressurized air present in the auxiliary air supply passage to be passed through the valve device to the brake chamber. Accordingly, when the system fails to provide pressurized air through the regular air supply passage, the valve device is automatically set in a “ready-to-release-mode” by allowing the spring device to move the valve device towards the open second state, making the system ready for enabling pressurized air to be passed to the brake chamber via the auxiliary air supply passage. Irrespective of the type of pressure-responsive element (e.g. controlling the movement of the valve device by fluid/mechanical force or by an electric signal), the spring device may suitably be configured to provide a sufficient spring force to avoid inadvertent movement of the valve device. In the case of a mechanical/fluid-based pressure-responsive element that moves based on the force/pressure to which it is subjected, the spring force may suitably be set to be of a magnitude that is slightly below the fluid force that the pressure-responsive element is subjected to when the regular air supply passage is functioning normally and provides pressurized air to the pressure-responsive element.

In some examples, optionally when the pressure-responsive element is subjected to a pressure which results in the valve device being subjected to an actuating force that is greater than the spring force of the spring device, then the valve device is moved to the closed first state. A technical benefit may include that, irrespective of if it is a fluid force or an electromechanical force that is caused to move the valve device, the spring device may be designed to provide an appropriate spring force to be overcome in order to move the valve device to the closed first state. Thus, the risk of inadvertent closing of the valve device may be reduced.

In some examples, optionally the brake release system may further comprise:

a control unit configured to receive an electronic parking signal indicative of a request to apply the parking brake, a pressure switch in fluid communication with the auxiliary air supply passage, wherein pressurized air in the auxiliary air supply passage triggers the pressure switch to send a pressure switch signal to the control unit, wherein upon receiving simultaneously the electronic parking signal and the pressure switch signal, the control unit issues a warning signal/message to alert the driver that the parking brake is released.

A technical benefit may include that the driver is alerted if the valve device is malfunctioning. For instance, after the regular air supply passage has been repaired at a workshop, but the valve device does not become actuated by the pressure in the regular air supply passage, then there will still be pressurized air left in the auxiliary air supply passage. This means that the valve device is still in its open second state because the pressurized air in the brake chamber has not been exhausted through the exhaust port. Thus, because the brake chamber is still pressurized by the pressurized air, the parking brake remains released. Therefore, even though the driver/operator has intentionally requested the parking brake to be applied by using the regular air supply passage (e.g. the driver has pushed or pulled the regular control button/switch), because of the valve device malfunctioning, the parking brake will remain released. Another potential scenario might be that after the vehicle has been towed away, and someone (e.g. another person than the one that has towed the vehicle) wants to apply the parking brake, he/she will be notified that the parking brake cannot be applied and is still in released condition (i.e. before the regular air supply passage has been repaired, and the valve device working properly).

In some examples, optionally the brake release system may further comprise:

a shuttle valve having three openings, a first opening to the brake chamber, a second opening to the auxiliary air supply passage, and a third opening to the regular air supply passage, wherein when the regular air supply passage supplies pressurized air, the shuttle valve closes fluid communication between the brake chamber and the auxiliary air supply passage.

A technical benefit may include that compounding issues in the shuttle valve may be counteracted. At the same time as the regular air supply passage supplies pressurized air to the shuttle valve, pressurized air in the auxiliary air supply passage will be exhausted because the pressure in the regular air supply passage has moved the valve device to the closed first state. By depleting the air pressure from the auxiliary air supply passage by means of the “pilot signal” from the regular air supply passage to the valve device counteracts compounding issues in the shuttle valve.

In some examples, optionally the brake release system further comprises:

an air production modulator (APM) configured to receive an electronic parking input signal indicative of request for parking brake activation or parking brake release, wherein the air production modulator is, upon receipt of input signal indicative of request for parking brake release, configured to provide the regular air supply passage in fluid communication with an air compressor.

A technical benefit may include that an efficient electronic control of the parking brake may be achieved.

In some examples, optionally the air production modulator is, upon receipt of input signal indicative of request for parking brake release configured to provide the auxiliary pressure port in fluid communication with said air compressor. A technical benefit may include that the auxiliary pressure port will, as long as the air compressor is functional, automatically be ready for use in case the regular air supply passage fails and auxiliary release of the parking brake is needed.

In some examples, optionally the air production modulator is, upon receipt of input signal indicative of request for parking brake activation, configured to open an exhaust port of the air production modulator to exhaust pressurized air from the regular air supply passage. A technical benefit may include that an efficient electronic control of the parking brake may be achieved.

According to a second aspect of the disclosure, there is provided a vehicle comprising the brake release system according to the first aspect, including any examples thereof. The second aspect of the disclosure may seek to facilitate the handling of breakdown vehicles, in particular facilitating the operation of the parking brake. Technical benefits may include the corresponding benefits as discussed above in relation to the brake release system according to the first aspect, including any examples thereof.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

The present disclosure teaches that an auxiliary air supply passage may be used for releasing a parking brake when the regular air supply passage has failed, and that after repair, any pressurized air remaining in the auxiliary air supply passage may be evacuated via a valve device that can be actuated by means of pressurized air from the regular air supply passage.

Figure 1:
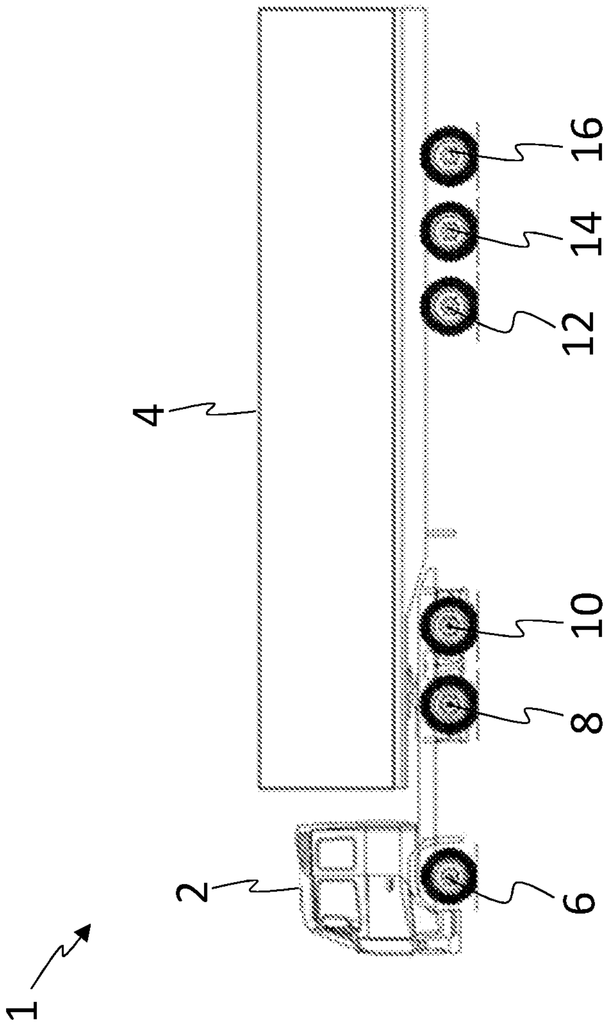
FIG. 1 schematically illustrates a vehicle according to one example of this disclosure.

FIG. 1 schematically illustrates a vehicle 1 according to one example of this disclosure. More specifically, the illustrated vehicle 1 is a heavy-duty vehicle combination which comprises a tractor unit 2 and a trailer unit 4. The tractor unit 2 is here shown as having three wheel axles 6, 8, 10, each one of the wheel axles 6, 8, 10 having at least one left wheel and at least one right wheel. Similarly, the trailer unit 4 is here shown as having three wheel axles 12, 14, 16, each one of these three wheel axles 12, 14, 16 having at least one left wheel and at least one right wheel. One or more wheels, for example, all wheels on the tractor unit 2 and/or the trailer unit 4 may be associated with a respective brake chamber of a parking brake system. It should be understood that the teachings of this disclosure may be implemented for the tractor unit 2 as well as for the trailer unit 4. Thus, the brake release system of this disclosure may be used for releasing the parking brake for either one of, or both of, the tractor unit 2 and the trailer unit 4. Indeed, the teachings of this disclosure may be implemented in relation to brake chambers of different types of trailer units, such as full trailers or semi-trailers. Additionally, the teachings of the present disclosure is not limited to a particular vehicle propulsion system, i.e., the teachings herein may be implemented for vehicles propelled by internal combustion engines, traction batteries, fuel cells, hybrid systems, etc. Furthermore, the teachings of the present disclosure may be implemented for driver-operated vehicles and for autonomous (self-driving) vehicles.

Figure 2:
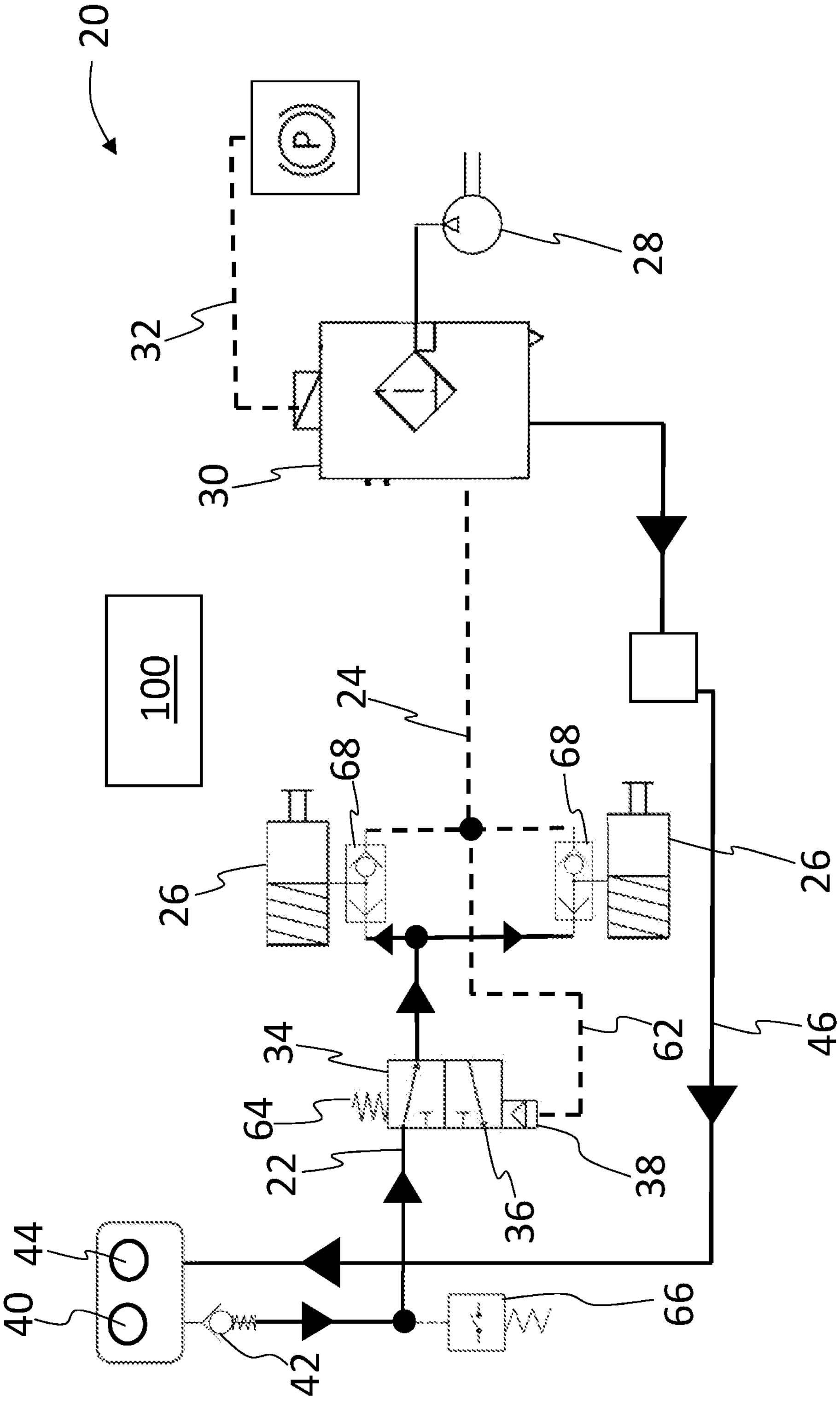
FIGS. 2 and 3 schematically illustrate a brake release system according to at least one example of this disclosure.
Figure 3:
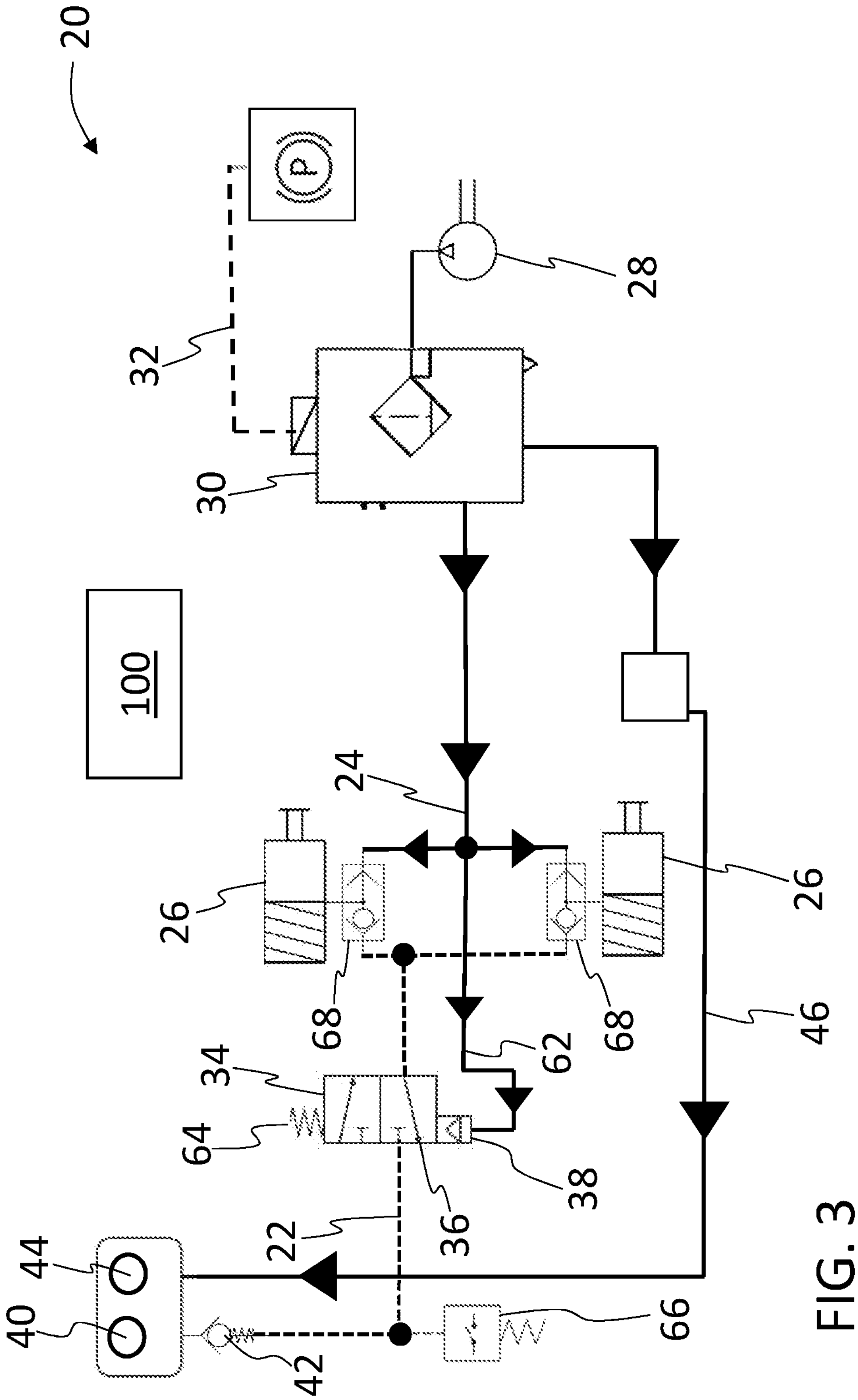

FIGS. 2 and 3 schematically illustrate a brake release system 20 according to at least one example of this disclosure. FIG. 2 illustrates an operation of the brake release system 20 when an auxiliary air supply passage 22 is in use for releasing the parking brake, whereas the regular air supply passage 24 is out of order. FIG. 3 illustrates an operation of the brake release system 20 after the regular air supply passage 24 has been repaired, whereas the auxiliary air supply passage 22 is no longer needed for releasing the parking brake.

Thus, FIGS. 2 and 3 illustrate operations of a brake release system 20 at two different occasions. The brake release system 20 is for a vehicle comprising a parking brake having a brake chamber 26. In practice, there will be multiple brake chambers, such as one brake chamber associated with each wheel. In FIGS. 2 and 3 there are two brake chambers 26 illustrated, which may represent brake chambers 26 for a left wheel and a right wheel on a common wheel axle.

As already mentioned, the brake release system 20 comprises the regular air supply passage 24. The regular air supply passage is configured to supply pressurized air to the brake chambers 26 for releasing the parking brake. The brake release system 20 also comprises the auxiliary air supply passage 22. The auxiliary air supply passage 22 is also configured to supply pressurized air to the brake chambers 26 for releasing the parking brake. However, the auxiliary air supply passage 22 is configured to be used in case of failure of the regular air supply passage 24. Thus, under normal circumstances, release of the parking brake should be actuated via the regular air supply passage 24.

The brake chambers 26 may be spring-biased such that the pressurized air counteracts the spring-bias to release the parking brake, whereas lack of pressurized air in the brake chambers 26 causes the parking brake to be applied due to the spring-bias. In case of a vehicle breakdown, the parking brake needs to be released for facilitating towing away the vehicle. If pressurized air can be provided through the regular air supply passage 24, then the parking brake will be released normally. However, if no pressurized air can be provided through the regular air supply passage 24 to release the parking brake, then the auxiliary air supply passage 22 will be used. Reasons for no pressurized air being provided through the regular air supply passage 24 may include that the regular air supply passage 24 is damaged, or that no pressurized air enters the regular air supply passage 24 due to malfunctioning pressure source, such as a malfunctioning air compressor 28.

FIGS. 2 and 3 illustrate that the normal activation and release of the parking brake, and thus the control of the pressurized air may, in at least some examples, be electronically controlled. In particular, FIGS. 2 and 3 illustrate that the brake release system 20 may comprise an air production modulator (APM) 30 configured to receive an electronic parking input signal 32 indicative of request for parking brake activation or parking brake release, wherein the air production modulator 30 is, upon receipt of input signal 32 indicative of request for parking brake release, configured to provide the regular air supply passage 24 in fluid communication with the 28 air compressor under normal circumstances. The air production modulator 30 may suitably be controllable such that compressed air from the air compressor 28 can be selectively passed to the regular air supply passage 24 and/or to the auxiliary air supply passage 22.

It should be understood that the brake release system 20 of this disclosure is not limited to electronically controlled parking brakes. In some examples, the brake release system 20 may include a lever type mechanical parking brake. In such case, the air production modulator 30 may be replaced by a lever-controlled valve.

The brake release system 20 further comprises a valve device 34 provided in the auxiliary air supply passage 22.

The valve device 34 comprises an exhaust port 36. The valve device 34 has a closed first state (FIG. 3) and an open second state (FIG. 2). In the closed first state pressurized air is prevented from being supplied form the auxiliary air supply passage 22 to the brake chambers 26 through the valve device 34. Furthermore, when the valve device 34 is in the closed first state any pressurized air in the auxiliary air supply passage 22 is exhausted via the exhaust port 36 of the valve device 34. In the open second state pressurized air is allowed to be supplied from the auxiliary air supply passage 22 to the brake chambers 26 through the valve device 34 for releasing the parking brake.

The brake release system 20 further comprises a pressure-responsive element 38 configured to actuate the valve device 34 and configured to be in fluid communication with the regular air supply passage 24. When pressurized air is supplied through the regular air supply passage 24 (FIG. 3) then the pressurized air activates the pressure-responsive element 38 so as to actuate the valve device 34 to move to said closed first state, and when no pressurized air is supplied through the regular air supply passage 24 (FIG. 2) then the pressure-responsive element 38 is deactivated to allow the valve device 34 to move to said open second state. Thus, once the system 20 has been repaired and air can be provided to the brake chambers 26 via the regular air supply passage 24, the valve device 34 will automatically be moved to the closed first state, exhausting any pressurized air in the auxiliary air supply passage 22. Thus, the valve device 34 may be referred to as an auto-exhaust valve device.

As show in FIGS. 2 and 3 the brake release system 20 may further comprise an auxiliary supply port 40 configured to be able to receive pressurized air. As will be discussed in more detail later, there may be different ways to provide pressurized air to the auxiliary supply port 40. Nevertheless, irrespective of how the auxiliary supply port 40 receives the pressurized air, the auxiliary air supply passage 22 may be configured to interconnect the auxiliary supply port 40 with the brake chambers 26. Thus, in the open second state of the valve device 34 pressurized air may be allowed to flow from the auxiliary supply port 40, via the auxiliary air supply passage 22 and the valve device 34, to the brake chambers 26, whereby the parking brake is released. In the closed first state, however, the fluid communication from the auxiliary supply port 40 to the brake chambers 26 is disconnected.

As illustrated in FIGS. 2 and 3, the brake release system 20 further comprises a check valve 42 provided in the auxiliary air supply passage 22 at a location between the auxiliary supply port 40 and the valve device 34. The check valve 42 is configured to allow pressurized air to be passed from the auxiliary supply port 40 to the valve device 34 (as indicated in FIG. 2), and configured to prevent pressurized air from being passed from the valve device 34 to the auxiliary supply port 40.

The brake release system 20 further comprises an auxiliary pressure port 44 which is configured to be able to receive pressurized air from the air compressor 28 of the vehicle. In FIG. 2 it is illustrated how the compressor 28 via the air production modulator 30 supplies pressurized air to the auxiliary pressure port 44. The auxiliary supply port 40 is connectable to the auxiliary pressure port 44 so as to receive the pressurized air from the air compressor 28 via the auxiliary pressure port. In some examples, the air production modulator 30 may, upon receipt of an input signal 32 indicative of a request for release of the parking brake, be configured to provide the auxiliary pressure port 44 in fluid communication with the air compressor 28. In FIGS. 2 and 3, the auxiliary pressure port 44 is in fluid communication with the air production modulator 30 via an air passage 46. In FIG. 2, the auxiliary pressure port is also in fluid communication with the auxiliary supply port 40, thereby allowing pressurized air form the compressor 28 to be provided to the auxiliary air supply passage 22. In FIG. 3, however, the fluid communication between auxiliary pressure port 44 and the auxiliary supply port 40 is closed. Thus, any pressurized air from the compressor 28 reaching the auxiliary supply port 44, will not be forwarded, as in this case, the regular air supply passage 24 is functioning normally again.

Some examples of fluidly connecting the auxiliary pressure port 44 with the auxiliary supply port 40 will now be discussed in connection with FIGS. 4, 4*a* and 4*b*.

Figure 4:
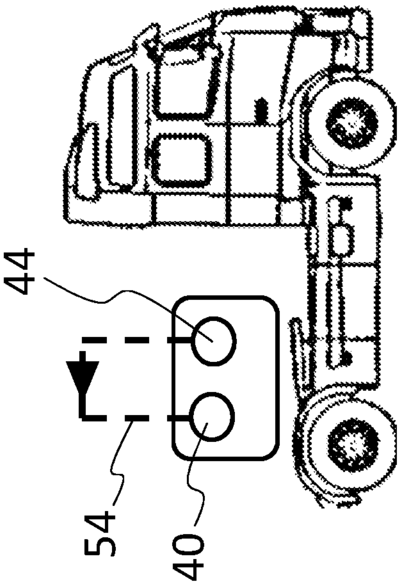
FIGS. 4, 4*a* and 4*b* schematically illustrate different alternative examples of an optional part of a brake release system of this disclosure.
Figure 4A:
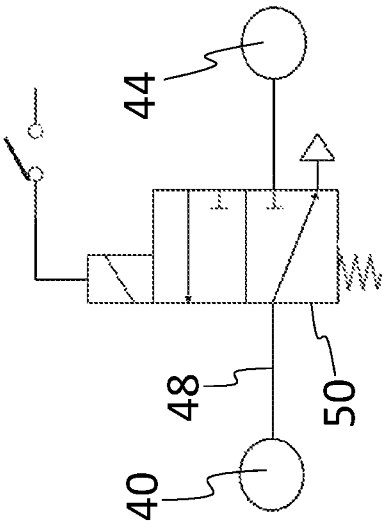
Figure 4B:
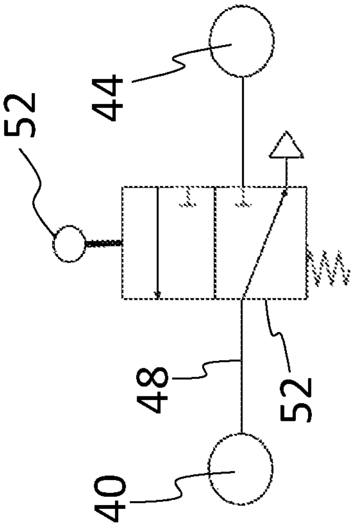

FIGS. 4, 4*a* and 4*b* schematically illustrate different alternative examples of an optional part of a brake release system of this disclosure. In particular, FIGS. 4, 4*a* and 4*b* illustrate different examples of fluidly connecting the auxiliary pressure port 44 to the auxiliary supply port 40. As schematically illustrated in both FIG. 4*a* and FIG. 4*b*, the brake release system may comprise a flow channel 48 extending from the auxiliary pressure port 44 to the auxiliary supply port 40. A controllable valve may be provided in said flow channel 48. FIG. 4*a* illustrates an electronically controllable valve 50, whereas FIG. 4*b* illustrates a mechanically controllable valve 52 having a manually operated lever 52 for switching position of the mechanically controllable valve 52. In either case, the controllable valve 50, 52 may have a closed position in which air flow from the auxiliary pressure port 44 to the auxiliary supply port 40 is prevented (as shown in FIGS. 4*a* and 4*b*), and an open position in which air flow from the auxiliary pressure port 44 to the auxiliary supply port 40 is allowed through the controllable valve 50, 52 and the flow channel 48.

While the flow channel 48 in FIGS. 4*a* and 4*b* may suitably be configured as an internal channel within a module holding both the auxiliary pressure port 44 and the auxiliary supply port 40, in some examples it is conceivable to instead (or additionally) allow for an external connection, as schematically illustrated in FIG. 4. The schematic illustration in FIG. 4, with its dashed line 54, may represent that a hose, tube or other guide may be used to fluidly connect the auxiliary pressure port 44 to the auxiliary supply port 40. The auxiliary pressure port 44 and the auxiliary supply port 40 may suitably be provided with connectors to which a hose, tube or other guide may be connected, such as by a bayonet connection, screw connection, clamp connection, or any other suitable connection.

The examples of FIGS. 4, 4*a* and 4*b* are examples in which the pressurized air may be supplied from a pressure source present on the vehicle, such as from a compressor 28 as shown in FIGS. 2 and 3. However, in case the pressure source cannot supply pressurized air to the auxiliary supply port 40 (via the auxiliary pressure port 44), then it may be advantageous if the auxiliary supply port 40 may receive the pressurized air form another pressure source than that of the present vehicle. Such a possibility is illustrated in FIG. 5.

Figure 5:
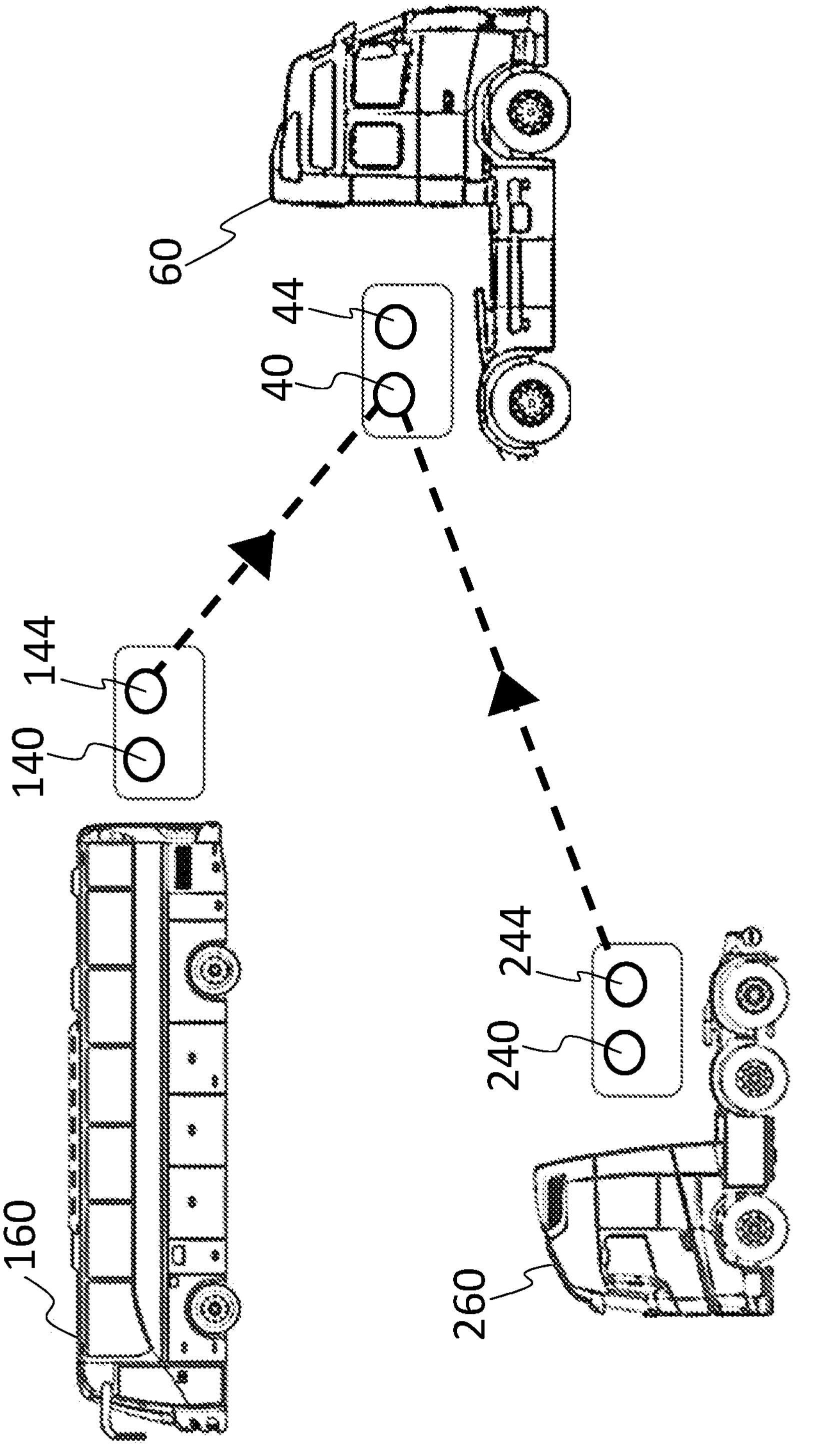
FIG. 5 schematically illustrates different possibilities for releasing the parking brake of a vehicle by involving another vehicle.

FIG. 5 schematically illustrates different possibilities for releasing the parking brake of a vehicle 60 by involving another vehicle 160, 260. As illustrated each vehicle 60, 160, 260 may be provided with a respective auxiliary supply port 40, 140, 240 and a respective auxiliary pressure port 44, 144, 244. As illustrated in FIG. 5, the auxiliary supply port 40 of one vehicle 60 (here a truck), may receive pressurized air by fluidly interconnecting it with an auxiliary pressure port 144 or 244 of another vehicle 160 or 260 (such as a bus 160 or another truck 260). The interconnection may suitably be accomplished by means of a hose extending from the auxiliary pressure port 144/244 of said other vehicle 160/260 to the auxiliary supply port 40 of the present vehicle 60. Conversely, if the present vehicle 60 functions normally, then its auxiliary pressure port 44 may of course be used to assist in providing pressurized air to any other vehicle, such as to the auxiliary supply port 140/240 of either one of said other vehicles 160/260.

Turning back to FIGS. 2 and 3, the pressure-responsive element 38 may suitably be part of or be mechanically connected to the valve device 34. When the pressure-responsive element 38 is subjected to the pressurized air from the regular air supply passage 24 the pressure-responsive element 38 is moved, causing the valve device 34 to be moved to said closed first state (FIG. 3). As illustrated in FIGS. 2 and 3, the brake release system 20 may suitably comprise a bleed passage 62 configured to be in fluid communication with the regular air supply passage 24. The bleed passage 62 may be configured to bleed air from the regular air supply passage 24 to the pressure-responsive element 38. Thus, when the regular air supply passage 24 functions normally, the pressure-responsive element 38 may be subjected to the same pressure as the brake chambers 26. From the above, it may be understood that the valve device 34 may suitably be a pressure-actuated valve device 34. An alternative to the mechanically affected valve device 34 illustrated in FIGS. 2 and 3 would be an electronically affected valve device 34*a*, such as the one illustrated in FIG. 3*a*.

Figure 3A:
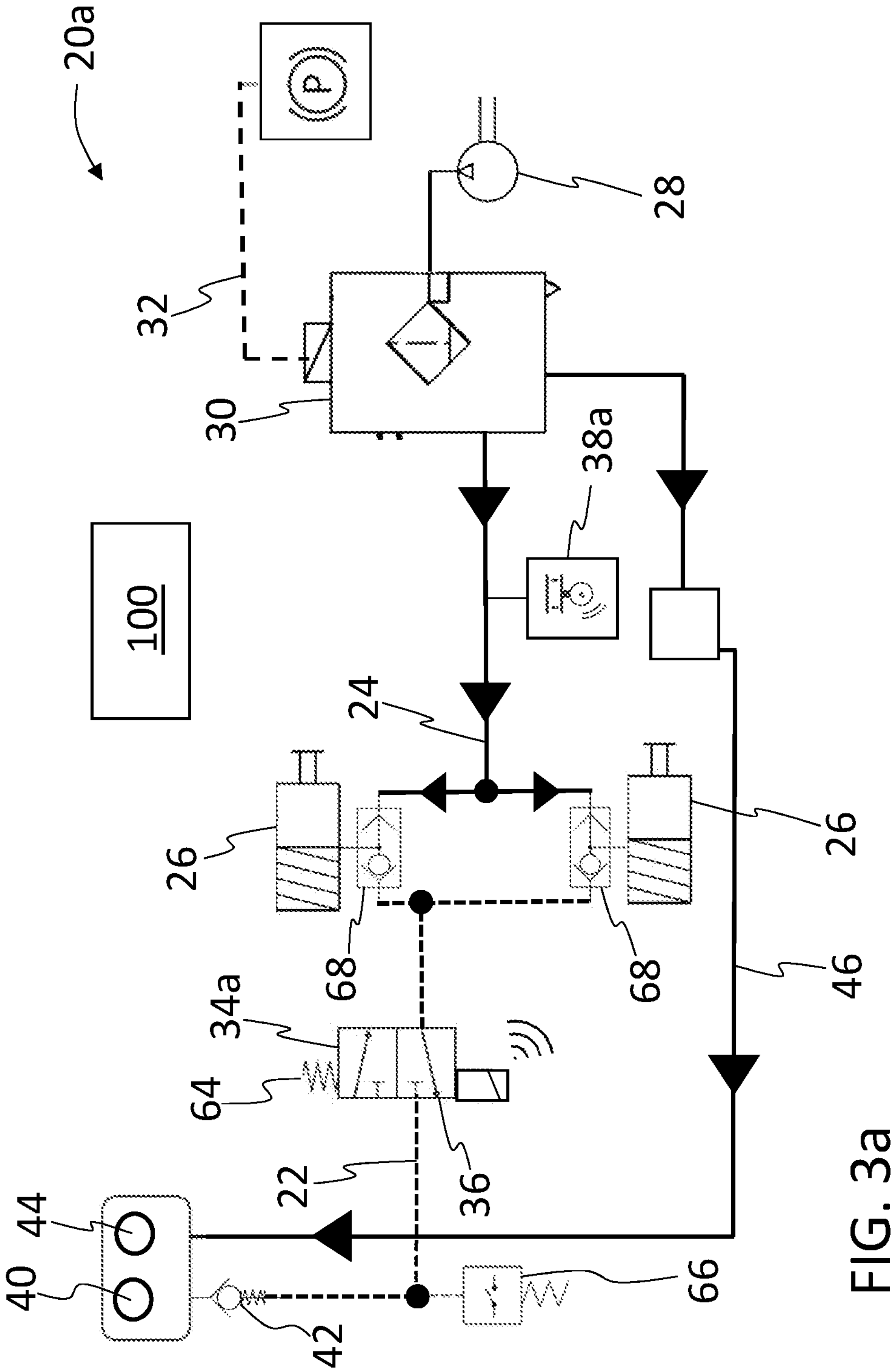
FIG. 3*a* shows a slight variation of FIG. 3.

FIG. 3*a* illustrates a slight variant of FIG. 3. Similarly to the examples in FIGS. 2 and 3, in the brake release system 20*a* in FIG. 3*a* there is provided a pressure-responsive element 38*a* which is in fluid communication with the regular air supply passage 24. Unlike the previous example, in which the pressurized air was bled via a bleed passage 62 (see FIG. 3) to provide a fluid pressure for causing a mechanical pushing effect on the valve device, in the example of FIG. 3*a*, electric signals are instead used to affect the valve device 34*a*. The pressure-responsive element 38*a* comprises a pressure switch which is configured to send an electric signal when activated, wherein the valve device 34*a* is configured to be actuated by the electric signal to move to the closed first state. Although for simplicity the electric signaling is here illustrated as including wireless communication, it should be understood that wired communication between the pressure-responsive element 38*a* (in particular, the pressure switch of the pressure-responsive element) and the valve device 34*a* is also encompassed by this disclosure. In the example in FIG. 3*a*, the valve device 34*a* may suitably be or comprise a solenoid valve.

As illustrated in each one of FIGS. 2, 3 and 3*a*, the brake release system 20, 20*a* may further comprise a spring device 64 configured to bias the valve device 34, 34*a* towards the open second state, in which pressurized air passing through the auxiliary air supply passage 22 is allowed to pass to the brake chambers 26. In other words, when there is no pressure in the regular air supply passage 24 (for example due to failure in the actual regular air supply passage 24 or failure in a source of pressurized air connected to the regular air supply passage 24, such as failure of the air compressor 28), then the valve device 34, 34*a* will automatically be set in the open second state, making the auxiliary air supply passage 22 ready to deliver pressurized air to the brake chambers 26. Thus, when pressurized air is later provided through the air supply port 40, be it via an external hose or internally form a flow channel and compressor as discussed above, the auxiliary air supply passage 22 will be allowed to pass the pressurized air to the brake chambers 26, thereby releasing the parking brake.

It should be understood that the spring force of the spring device 64 may be appropriately dimensioned based on the pressure that is expected to be supplied through the regular air supply passage 24 under normally functioning circumstances, when it comes to the example in FIGS. 2 and 3. In the example of FIG. 3*a*, however, the spring force may be dimensioned based on the electromagnetic force provided when for example a solenoid valve is activated.

From the above it can be understood that when the pressure-responsive element 38, 38*a* is subjected to a pressure which results in the valve device 34, 34*a* being subjected to an actuating force that is greater than the spring force of the spring device 64, then the valve device 34, 34*a* is moved to the closed first state.

As illustrated in FIGS. 2, 3 and 3*a*, the brake release system 20, 20*a* may further comprise a control unit 100. In order to not obscure the legibility of the drawings, the control unit 100 has been illustrated as a separate component. It should, however, be understood that the control unit 100 may be appropriately operatively connected to other components of the brake release system 20, 20*a*, such as by wired or by wireless communication. The control unit 100 may, for instance, be configured to receive an electronic parking signal indicative of a request to apply the parking brake.

The brake release system 20, 20*a* may further comprise a pressure switch 66 in fluid communication with the auxiliary air supply passage 22, wherein pressurized air in the auxiliary air supply passage 22 triggers the pressure switch 66 to send a pressure switch signal to the control unit 100. Upon receiving simultaneously the electronic parking signal and the pressure switch signal the control unit 100 may issue a notification (such as a warning signal and/or a message) to alert the driver that the parking brake is released. For instance, if the valve device 34, 34*a* itself is malfunctioning and cannot become actuated by the pressure despite the regular air supply passage 22 delivering pressurized air, the driver may become notified. In such case the valve device 34, 34*a* is still in the open second state and the parking brake remains released, despite the driver trying to apply the parking brake.

The brake release system 20, 20*a* may further comprise a shuttle valve 68 associated with each brake chamber 26. The shuttle valve 68 may have three openings, a first opening to the brake chamber 26, a second opening to the auxiliary air supply passage 22, and a third opening to the regular air supply passage 24. When the regular air supply passage 24 supplies pressurized air, the shuttle valve 68 closes fluid communication between the brake chamber 26 and the auxiliary air supply passage 22. At the same time, pressurized air in the auxiliary air supply passage 22 is exhauster through the exhaust port 36 of the valve device 34, 34*a*. In this way compounding issues in the shuttle valve 68 may be counteracted.

Figure 6:
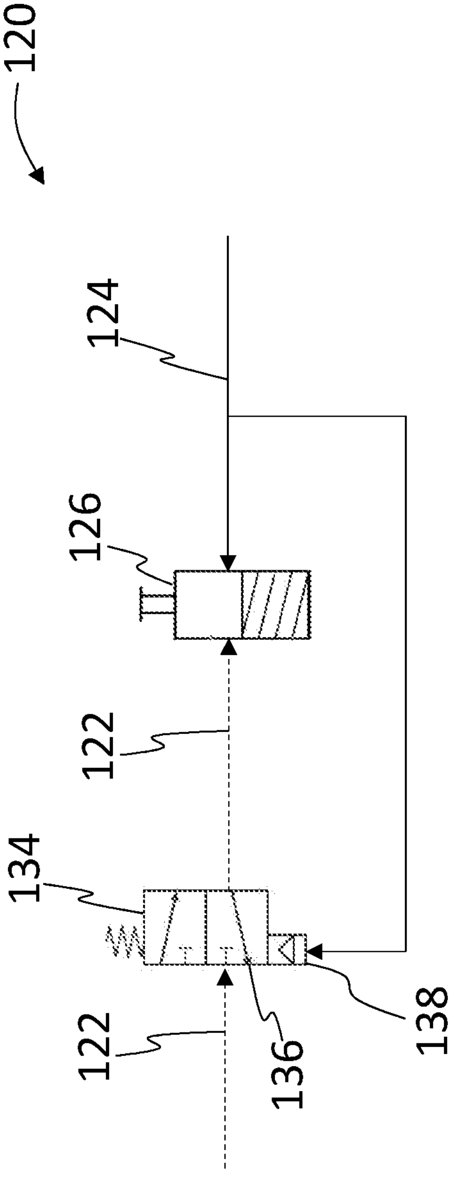
FIG. 6 is another view of FIG. 2, according to an example.

FIG. 6 is another view of FIG. 2, according to an example. FIG. 6 schematically illustrates a brake release system 120 for a vehicle comprising a parking brake having a brake chamber 126, the brake release system 120 comprising:

a regular air supply passage 124 configured to supply pressurized air to the brake chamber 126 for releasing the parking brake, an auxiliary air supply passage 122 configured to supply pressurized air to the brake chamber 126 for releasing the parking brake, wherein the auxiliary air supply passage 122 is configured to be used in case of failure of the regular air supply passage 126, a valve device 134 provided in the auxiliary air supply passage 122, the valve device 122 comprising an exhaust port 136, wherein the valve device 134 has:

a closed first state in which pressurized air is prevented from being supplied from the auxiliary air supply passage 122 to the brake chamber 126 through the valve device 134, and in which closed first state any pressurized air in the auxiliary air supply passage 122 is exhausted via the exhaust port 136 of the valve device 134, and an open second state in which pressurized air is allowed to be supplied from the auxiliary air supply passage 122 to the brake chamber 126 through the valve device 134 for releasing the parking brake, a pressure-responsive element 138 configured to actuate the valve device 134 and configured to be in fluid communication with the regular air supply passage 124, such that when pressurized air is supplied through the regular air supply passage 124 then the pressurized air activates the pressure-responsive element 138 so as to actuate the valve device 134 to move to said closed first state, and when no pressurized air is supplied through the regular air supply passage 124 then the pressure-responsive element 138 is deactivated to allow the valve device 134 to move to said open second state.

Example 1: A brake release system for a vehicle comprising a parking brake having a brake chamber, the brake release system comprising:

a regular air supply passage configured to supply pressurized air to the brake chamber for releasing the parking brake, an auxiliary air supply passage configured to supply pressurized air to the brake chamber for releasing the parking brake, wherein the auxiliary air supply passage is configured to be used in case of failure of the regular air supply passage, a valve device provided in the auxiliary air supply passage, the valve device comprising an exhaust port, wherein the valve device has:

a closed first state in which pressurized air is prevented from being supplied from the auxiliary air supply passage to the brake chamber through the valve device, and in which closed first state any pressurized air in the auxiliary air supply passage is exhausted via the exhaust port of the valve device, and an open second state in which pressurized air is allowed to be supplied from the auxiliary air supply passage to the brake chamber through the valve device for releasing the parking brake, a pressure-responsive element configured to actuate the valve device and configured to be in fluid communication with the regular air supply passage, such that when pressurized air is supplied through the regular air supply passage then the pressurized air activates the pressure-responsive element so as to actuate the valve device to move to said closed first state, and when no pressurized air is supplied through the regular air supply passage then the pressure-responsive element is deactivated to allow the valve device to move to said open second state.

Example 2: The brake release system of Example 1, further comprising:

an auxiliary supply port configured to be able to receive pressurized air, wherein the auxiliary air supply passage is configured to interconnect the auxiliary supply port with the brake chamber, wherein in the closed first state of the valve device, fluid communication from the auxiliary supply port to the brake chamber is disconnected, wherein in the open second state of the valve device, fluid communication from the auxiliary supply port to the brake chamber is allowed, such that when the auxiliary supply port receives pressurized air and the valve device is in the open second state, the pressurized air flows from the auxiliary supply port via the auxiliary air supply passage and the valve device to the brake chamber, thereby releasing the parking brake.

Example 3: The brake release system of Example 2, further comprising:

a check valve provided in the auxiliary air supply passage at a location between the auxiliary supply port and the valve device, wherein the check valve is configured to allow pressurized air to be passed from the auxiliary supply port to the valve device, but prevent pressurized air from being passed from the valve device to the auxiliary supply port.

Example 4: The brake release system of any of Examples 2-3, further comprising:

an auxiliary pressure port which is configured to be able to receive pressurized air from an air compressor of the vehicle, wherein the auxiliary supply port is connectable to the auxiliary pressure port so as to receive the pressurized air from the air compressor via the auxiliary pressure port.

Example 5: The brake release system of Example 4, further comprising:

a flow channel extending from the auxiliary pressure port to the auxiliary supply port, and a controllable valve provided in said flow channel, the controllable valve having a closed position in which air flow from the auxiliary pressure port to the auxiliary supply port is prevented, and an open position in which air flow from the auxiliary pressure port to the auxiliary supply port is allowed, wherein the controllable valve is mechanically controllable, such as by means of a lever, or electronically controllable to switch between said closed and open positions.

Example 6: The brake release system of any of Examples 2-5, further comprising:

a hose for connecting the auxiliary pressure port to the auxiliary supply port.

Example 7: The brake release system of any of Examples 2-6, wherein the auxiliary supply port is connectable to an auxiliary pressure port of another vehicle to allow for receipt of pressurized air from the other vehicle.

Example 8: The brake release system of any of Examples 1-7, wherein the pressure-responsive element is part of or is mechanically connected to the valve device, such that when the pressure-responsive element is subjected to the pressurized air from the regular air supply passage, the pressure-responsive element is moved, causing the valve device to be moved to said closed first state.

Example 9: The brake release system of Example 8, further comprising:

a bleed passage configured to be in fluid communication with the regular air supply passage, wherein the bleed passage is configured to bleed air from the regular air supply passage to the pressure-responsive element.

Example 10: The brake release system of any of Examples 8-9, wherein said valve device is a pressure-actuated valve device.

Example 11: The brake release system of Example 8, wherein the pressure-responsive element comprises a pressure-responsive switch which is configured to send an electric signal when activated, wherein the valve device is configured to be actuated by the electric signal to move to the closed first state.

Example 12: The brake release system of any of Examples 1-11, further comprising:

a spring device configured to bias the valve device towards said open second state.

Example 13: The brake release system of Example 12 when dependent on any one of claims 8-11, wherein when the pressure-responsive element is subjected to a pressure which results in the valve device being subjected to an actuating force that is greater than the spring force of the spring device, then the valve device is moved to the closed first state.

Example 14: The brake release system of any of Examples 1-13, further comprising:

a control unit configured to receive an electronic parking signal indicative of a request to apply the parking brake, a pressure switch in fluid communication with the auxiliary air supply passage, wherein pressurized air in the auxiliary air supply passage triggers the pressure switch to send a pressure switch signal to the control unit, wherein upon receiving simultaneously the electronic parking signal and the pressure switch signal, the control unit issues a warning signal/message to alert the driver that the parking brake is released.

Example 15: The brake release system of any of Examples 1-14, further comprising:

a shuttle valve having three openings, a first opening to the brake chamber, a second opening to the auxiliary air supply passage, and a third opening to the regular air supply passage, wherein when the regular air supply passage supplies pressurized air, the shuttle valve closes fluid communication between the brake chamber and the auxiliary air supply passage.

Example 16: A vehicle comprising the brake release system according to any of Examples 1-15

Example 17: The brake release system of any of Examples 1-14, further comprising:

an air production modulator (APM) configured to receive an electronic parking input signal indicative of request for parking brake activation or parking brake release, wherein the air production modulator is, upon receipt of input signal indicative of request for parking brake release, configured to provide the regular air supply passage in fluid communication with an air compressor.

Examples 18: The brake release system of Example 17, wherein the air production modulator is, upon receipt of input signal indicative of request for parking brake release configured to provide the auxiliary pressure port in fluid communication with said air compressor.

Example 19: The brake release system of any of Examples 17-18, wherein the air production modulator is, upon receipt of input signal indicative of request for parking brake activation, configured to open an exhaust port of the air production modulator to exhaust pressurized air from the regular air supply passage.

Example 20: The vehicle of Example 16, wherein the vehicle is a heavy-duty vehicle, such as a truck, a bus, or a construction equipment.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A brake release system for a vehicle comprising a parking brake having a brake chamber, the brake release system comprising:

a regular air supply passage configured to supply pressurized air to the brake chamber for releasing the parking brake, an auxiliary air supply passage configured to supply pressurized air to the brake chamber for releasing the parking brake, wherein the auxiliary air supply passage is configured to be used in case of failure of the regular air supply passage, a valve device provided in the auxiliary air supply passage, the valve device comprising an exhaust port, wherein the valve device has:

a closed first state in which pressurized air is prevented from being supplied from the auxiliary air supply passage to the brake chamber through the valve device, and in which closed first state any pressurized air in the auxiliary air supply passage is exhausted via the exhaust port of the valve device, and an open second state in which pressurized air is allowed to be supplied from the auxiliary air supply passage to the brake chamber through the valve device for releasing the parking brake, and a pressure-responsive element configured to actuate the valve device and configured to be in fluid communication with the regular air supply passage, such that when pressurized air is supplied through the regular air supply passage then the pressurized air activates the pressure-responsive element so as to actuate the valve device to move to said closed first state, and when no pressurized air is supplied through the regular air supply passage then the pressure-responsive element is deactivated to allow the valve device to move to said open second state.

2. The brake release system of claim 1, further comprising:

an auxiliary supply port configured to be able to receive pressurized air, wherein the auxiliary air supply passage is configured to interconnect the auxiliary supply port with the brake chamber, wherein in the closed first state of the valve device, fluid communication from the auxiliary supply port to the brake chamber is disconnected, wherein in the open second state of the valve device, fluid communication from the auxiliary supply port to the brake chamber is allowed, such that when the auxiliary supply port receives pressurized air and the valve device is in the open second state, the pressurized air flows from the auxiliary supply port via the auxiliary air supply passage and the valve device to the brake chamber, thereby releasing the parking brake.

3. The brake release system of claim 2, further comprising:

a check valve provided in the auxiliary air supply passage at a location between the auxiliary supply port and the valve device, wherein the check valve is configured to allow pressurized air to be passed from the auxiliary supply port to the valve device, but prevent pressurized air from being passed from the valve device to the auxiliary supply port.

4. The brake release system of claim 2, further comprising:

an auxiliary pressure port which is configured to be able to receive pressurized air from an air compressor of the vehicle, wherein the auxiliary supply port is connectable to the auxiliary pressure port so as to receive the pressurized air from the air compressor via the auxiliary pressure port.

5. The brake release system of claim 4, further comprising:

a flow channel extending from the auxiliary pressure port to the auxiliary supply port, and a controllable valve provided in said flow channel, the controllable valve having a closed position in which air flow from the auxiliary pressure port to the auxiliary supply port is prevented, and an open position in which air flow from the auxiliary pressure port to the auxiliary supply port is allowed, wherein the controllable valve is mechanically controllable, such as by means of a lever, or electronically controllable to switch between said closed and open positions.

6. The brake release system of claim 2, further comprising:

a hose for connecting an auxiliary pressure port to the auxiliary supply port.

7. The brake release system of claim 2, wherein the auxiliary supply port is connectable to an auxiliary pressure port of another vehicle to allow for receipt of pressurized air from the other vehicle.

8. The brake release system of claim 1, wherein the pressure-responsive element is part of or is mechanically connected to the valve device, such that when the pressure-responsive element is subjected to the pressurized air from the regular air supply passage, the pressure-responsive element is moved, causing the valve device to be moved to said closed first state.

9. The brake release system of claim 8, further comprising:

a bleed passage configured to be in fluid communication with the regular air supply passage, wherein the bleed passage is configured to bleed air from the regular air supply passage to the pressure-responsive element.

10. The brake release system of claim 8, wherein said valve device is a pressure-actuated valve device.

11. The brake release system of claim 8, wherein the pressure-responsive element comprises a pressure-responsive switch which is configured to send an electric signal when activated, wherein the valve device is configured to be actuated by the electric signal to move to the closed first state.

12. The brake release system of claim 8, further comprising:

a spring device configured to bias the valve device towards said open second state.

13. The brake release system of claim 12, wherein when the pressure-responsive element is subjected to a pressure which results in the valve device being subjected to an actuating force that is greater than the spring force of the spring device, then the valve device is moved to the closed first state.

14. The brake release system of claim 1, further comprising:

a control unit configured to receive an electronic parking signal indicative of a request to apply the parking brake, and a pressure switch in fluid communication with the auxiliary air supply passage, wherein pressurized air in the auxiliary air supply passage triggers the pressure switch to send a pressure switch signal to the control unit, wherein upon receiving simultaneously the electronic parking signal and the pressure switch signal, the control unit issues a warning signal/message to alert the driver that the parking brake is released.

15. The brake release system of claim 1, further comprising:

a shuttle valve having three openings, a first opening to the brake chamber, a second opening to the auxiliary air supply passage, and a third opening to the regular air supply passage, wherein when the regular air supply passage supplies pressurized air, the shuttle valve closes fluid communication between the brake chamber and the auxiliary air supply passage.

16. The brake release system of claim 1, further comprising:

an air production modulator (APM) configured to receive an electronic parking input signal indicative of request for parking brake activation or parking brake release, wherein the air production modulator is, upon receipt of input signal indicative of request for parking brake release, configured to provide the regular air supply passage in fluid communication with an air compressor.

17. The brake release system of claim 16, wherein the air production modulator is, upon receipt of input signal indicative of request for parking brake release, configured to provide an auxiliary pressure port in fluid communication with said air compressor.

18. The brake release system of claim 16, wherein the air production modulator is, upon receipt of input signal indicative of request for parking brake activation, configured to open an exhaust port of the air production modulator to exhaust pressurized air from the regular air supply passage.

19. A vehicle comprising the brake release system according to claim 1.

20. The vehicle of claim 19, wherein the vehicle is a heavy-duty vehicle.

* * * * *